(12) United States Patent
Krishnan et al.

(10) Patent No.: US 6,377,815 B1
(45) Date of Patent: Apr. 23, 2002

(54) CONFIGURING WIRELESS TERMINAL

(75) Inventors: Ram Krishnan; Johnny K. John, both of San Diego, CA (US)

(73) Assignee: Qualcomm, Incorporated, San Diego, CA (US)

( * ) Notice: Subject to any disclaimer, the term of this patent is extended or adjusted under 35 U.S.C. 154(b) by 0 days.

(21) Appl. No.: 09/339,344

(22) Filed: Jun. 23, 1999

(51) Int. Cl.[7] .............................. H04B 1/38; H04M 1/00
(52) U.S. Cl. ........................ 455/553; 455/557
(58) Field of Search ........................... 455/557, 422, 455/552–553, 550, 575; 375/222; 379/93.01, 93.09

(56) References Cited

U.S. PATENT DOCUMENTS

| | | | |
|---|---|---|---|
| 4,737,975 A | 4/1988 | Shafer | 379/58 |
| 5,483,576 A | 1/1996 | Staples | 379/58 |
| 5,802,471 A * | 9/1998 | Sawai et al. | 455/557 |
| 5,862,474 A | 1/1999 | Kimball | 455/418 |
| 5,864,763 A | 1/1999 | Leung et al. | 455/557 |
| 5,884,190 A * | 3/1999 | Lintula et al. | 455/557 |
| 5,905,951 A * | 5/1999 | Orosz | 455/557 |
| 5,930,719 A * | 7/1999 | Babitch et al. | 455/557 |
| 6,157,846 A * | 12/2000 | Manning et al. | 455/557 |

FOREIGN PATENT DOCUMENTS

WO  9800998  1/1998  ............ H04Q/7/38

* cited by examiner

*Primary Examiner*—Nguyen T. Vo
(74) *Attorney, Agent, or Firm*—Philip R. Wadsworth; Charles D. Brown; Howard Seo

(57) ABSTRACT

A switch (212) is included in a wireless terminal (206). Different settings of the switch cause a processor (210) in the wireless terminal to use different device algorithms. The switch itself is set by applying a code signal to the wireless terminal through its RJ-11 interface (208). The code is a sequence of Dual Tone Multiple Frequency (DTMF) tones, which may conveniently be provided by an ordinary telephone (214), or by a computer modem (204). A single wireless terminal may therefore be reconfigured on demand to interface with any of a variety of devices (202), (214).

9 Claims, 5 Drawing Sheets

CONFIGURING WIRELESS TERMINAL

TECHNICAL FIELD

This invention relates to wireless telephony and has particular relation to configuring a wireless terminal.

BACKGROUND ART

A wireless terminal emulates a standard wireline wall jack. A standard telephone will plug unto either of them, using a standard RJ-11 interface. A standard wireline wall jack, however, is attached to a 2-wire or 4-wire cable and sends and receives analog signals. A wireless terminal (in contrast) digitizes, modulates, and transmits the signals over an antenna; or it receives them from the antenna, and demodulates them before converting them to analog.

However, a standard telephone is not the only thing which will plug into an RJ-11 interface, whether the interface is to a wireline wall jack or to a wireless terminal. Fax machines, computers (and different computes use different modems, of the Bell type or the V-series type), and numerous other devices are all configured to use the standard RJ-11 interface. Each device compresses the data flowing from it (and decompresses the data flowing to it) in the way best suited to it, without regard to the data compression schemes used by other devices.

This wide variety of data compression schemes presents no problem to a wireline wall jack. There is an analog local loop (typically of copper wire) between the jack and the telephone company's first piece of equipment, and this local loop has a fairly broad bandwidth. Any reasonable data compression scheme can be accommodated. Moreover, to the extent that the analog wireline local loop does impose limits, these limits have been carefully considered in crafting the data compression scheme for the device at hand. There is a large installed base of devices, each using one of a fairly small number of compression schemes.

With a wireless terminal, however, the local loop to the first piece of telephone company equipment (the base station) has a much narrower bandwidth, and it is digital. The digitization process must be carefully matched to the data compression scheme being used. Therefore, a wireless terminal which has been designed to interface with a computer using, for example, a Bell modem will not work properly with a different computer using the more modem V-series modem, and vice versa. Bell modems, among other things, operate only at and below 1200 bits per second. Above that speed, all modems use V-series. If a user has two computers, one with a Bell modem and one with a V-series modem, then he needs two wireless terminals. This is true even though he never uses both computer/modem/wireless-terminal combinations at the same time. He needs yet a third wireless terminal to run his fax machine, a fourth terminal for some other device, and so on.

This requirement for multiple wireless terminals is wasteful. It has long been considered a necessary price to pay, however. The alternative is to abandon the large installed base of devices which were designed for wireline use, and create a new base of devices designed for wireless use. Not only is it wasteful to abandon perfectly good equipment, but it would create the requirement for multiple devices—one for wireless, one for wireline. This is even more expensive than the current system of multiple wireless terminals.

BRIEF DISCLOSURE OF THE INVENTION

Applicants have noticed that the physical characteristics of the signals being exchanged by the device and the wireless terminal are comparable regardless of what the device is. The wireless terminal's hardware, if capable of producing the correct voltages, frequencies, and power levels for one type of device, is generally capable of producing the correct voltages, frequencies, and power levels for the other types of devices as well. This capability results from the requirement that all devices be compatible with the wireline network. The significant difference between devices is not the physical characteristics of the signals, but the device algorithm used to produce them.

Applicants therefore provide a switch in the wireless terminal. Different settings of the switch cause a processor in the wireless terminal to use different device algorithms. The switch itself is set by applying a code signal to the wireless terminal through its RJ-11 interface. The code is a sequence of Dual Tone Multiple Frequency (DTMF) tones, which may conveniently be provided by the device itself, or by an ordinary telephone or any other device.

The present invention is not limited to computer modems, but applies to any device. Using the present invention, the user may use DTMF tones to control the behavior of the wireless terminal, no matter what device is using the terminal.

DETAILED DESCRIPTION OF THE PREFERRED EMBODIMENTS

Figure 1:
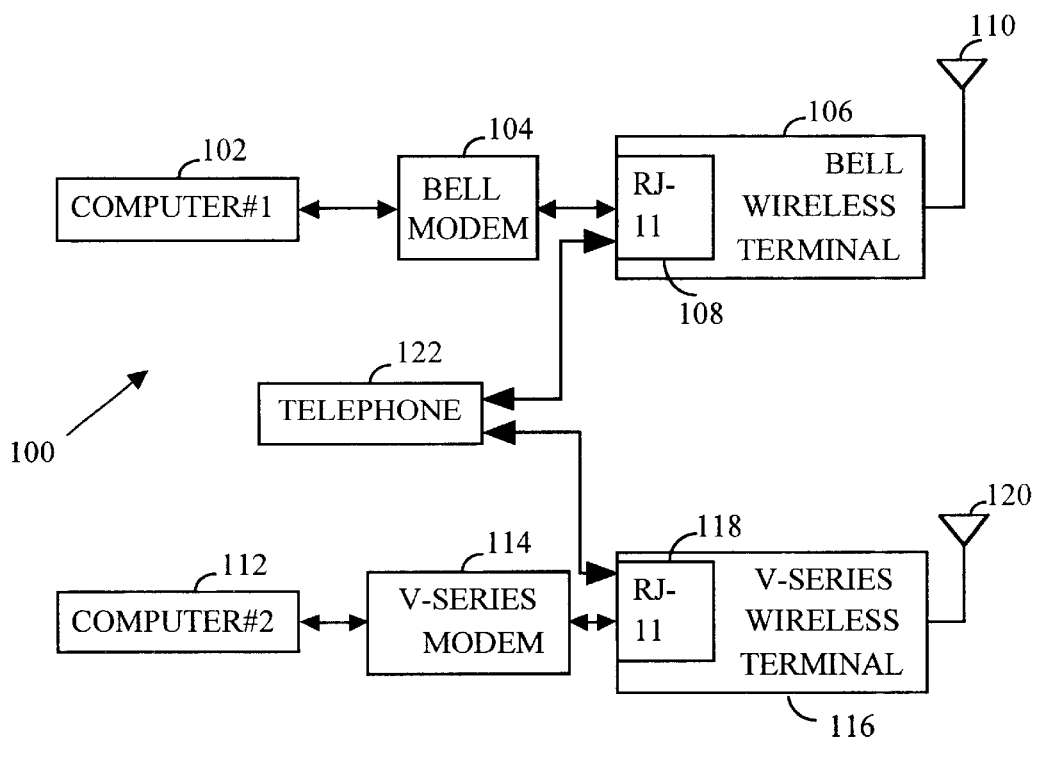
FIG. 1 is a block diagram of the prior art (100) as applied to data modems.

FIG. 1 is a block diagram of the prior art (100) as applied to data modems. A first computer (102) interfaces with a Bell modem (104), which in turn interfaces with a Bell wireless terminal (106) through an interface (108). The interface is preferably a standard RJ-11 interface. The Bell wireless terminal communicates with a remote device (not shown) through an antenna (110).

Likewise, a second computer (112) interfaces with a V-series modem (114), which in turn interfaces with a V-series wireless terminal (116) through an interface (118). The interface is also preferably a standard RJ-11 interface. The V-series wireless terminal communicates with a remote device (not shown) through antenna (120).

A telephone (122) can use either wireless terminal (106), (116) when that terminal's computer is not using it. The modems (104), (114) are shown as external to their respective computers (102), (112), but could also be internal.

Figure 2:
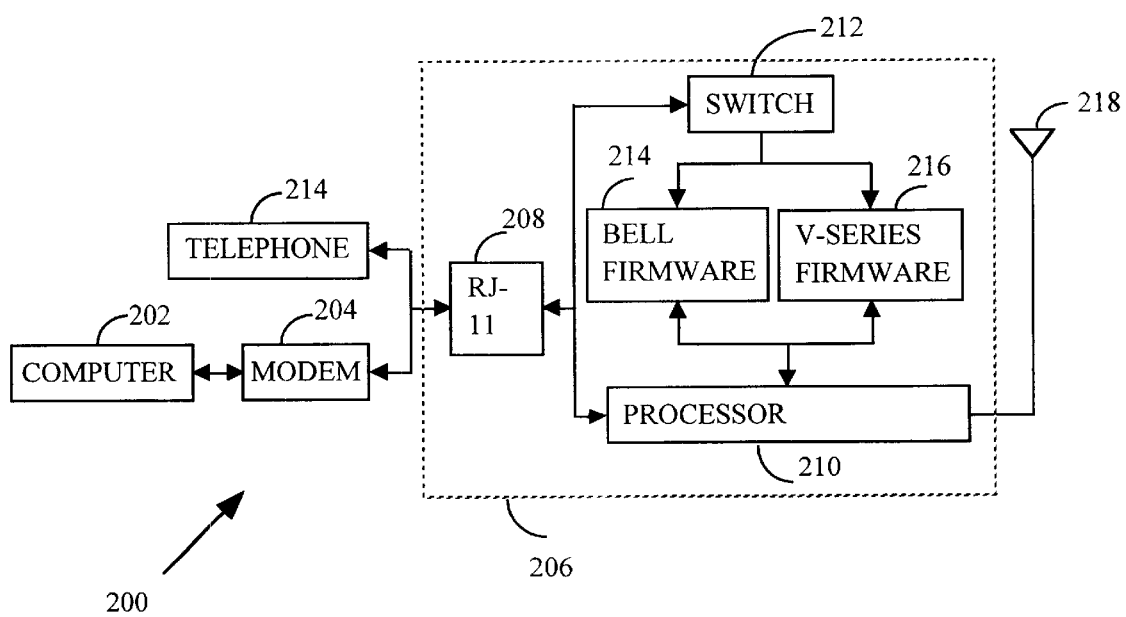
FIG. 2 is a block diagram of an embodiment of the apparatus (200) of the present invention as applied to data modems.

FIG. 2 is a block diagram of an embodiment of the apparatus (200) of the present invention as applied to data modems. A computer (202) interfaces with a modem (204). The modem may be either a Bell modem or a V-series modem, or any other modem whose specifications are known. The modem in turn interfaces with the wireless terminal (206) of the present invention through a modem interface (208). The modem interface is preferably an RJ-11.

A processor (210) within the wireless terminal (206) is connected to the modem interface (208). The wireless terminal also includes a switch (212) which is connected to the modem interface and to the processor. The switch is constructed to configure the processor to invoke a modem algorithm in response to receipt, by the switch through the modem interface, of a modem code.

The modem code comprises a sequence of Dual Tone Multiple Frequency (DTMF, sometimes called "Touch-Tone") tones. The DTMF tones are preferably generated in a telephone (214), but also may be generated in the computer (202). The computer typically applies suitable signals to the modem (204), which generates the tones under the computer's direction. In theory the computer could have DTMF capability built into it, but this is not preferred.

While it is possible for the wireless terminal (206) to be able to invoke only one modem algorithm, it is preferable for it to be able to invoke two or more modem algorithms, one at a time. In this case, the modem algorithm referred to above is a first modem algorithm and the modem code is a first modem code. The switch (212) is therefore further constructed to configure the processor (210) to invoke a second modem algorithm in response to receipt, by the switch through the modem interface, of a second modem code. The second modem code also comprises a sequence of Dual Tone Multiple Frequency (DTMF) tones. Each new application of a modem code to the switch reconfigures the wireless terminal to interface with a new type of modem (204).

A convenient sequence of DTMF tones for invoking the Bell algorithm is "#MBELL" (#62355). A convenient sequence of DTMF tones for invoking the V-series algorithm is "#MVSER" (#68737).

Plugging the telephone (214) into the modem interface (208), and entering a modem code into the keypad of the telephone, does not have the effect of actually placing a call. All it does is configure the wireless terminal (206) so that it can interface properly with the modem (204). Because the user knows what type of modem he has, he knows what code to enter.

Entering the modem code through the telephone (214) is preferred since the telephone always produces DTMF tones. However, the typical computer (202) which is connected to a modem (204) generally has a Phone Dialer feature. This feature can be used if the telephone is not available, or if the user finds it more convenient to use the Phone Dialer feature instead of the telephone itself.

The switch (212) may configure the processor (210) in any convenient way, and this configuration may be entirely conventional. For example, a block of Bell firmware (214) and a block of V-series firmware (216) may be toggled by the switch (212). Software implementations will also occur to the skilled artisan.

FIG. 2 shows the processor (210) interfacing directly with the antenna (218). In practice, the wireless terminal (206) would include additional apparatus (amplifiers, transmitter, etc.) which forms no part of the present invention and therefore will not be further described.

Figure 3:
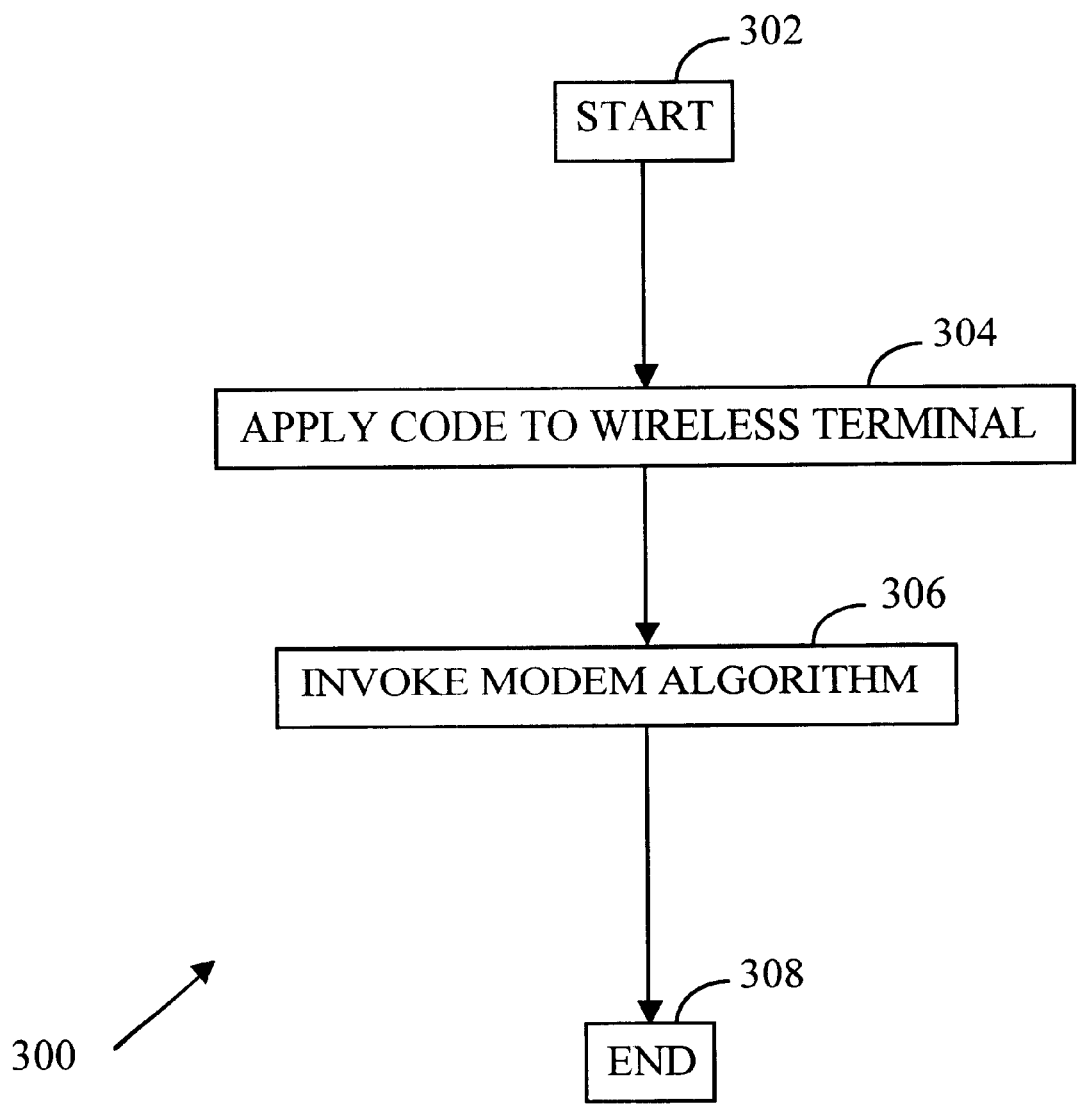
FIG. 3 is a block diagram of an embodiment of the method (300) of the present invention as applied to data modems.

FIG. 3 is a block diagram of an embodiment of the method (300) of the present invention as applied to data modems. After starting (302), we apply a modem code through the modem interface to a switch in the wireless terminal (304). This act configures the processor, under the control of the switch, to invoke a modem algorithm (306). This ends the method (308). As before, it is preferred that the modem algorithm be a first modem algorithm and the modem code be a first modem code. If so, we also later apply a second modem code through the modem interface to the switch, and configure the processor, under the control of the switch, to invoke a second modem algorithm in response to the act of applying the second modem code to the switch.

Figure 4:
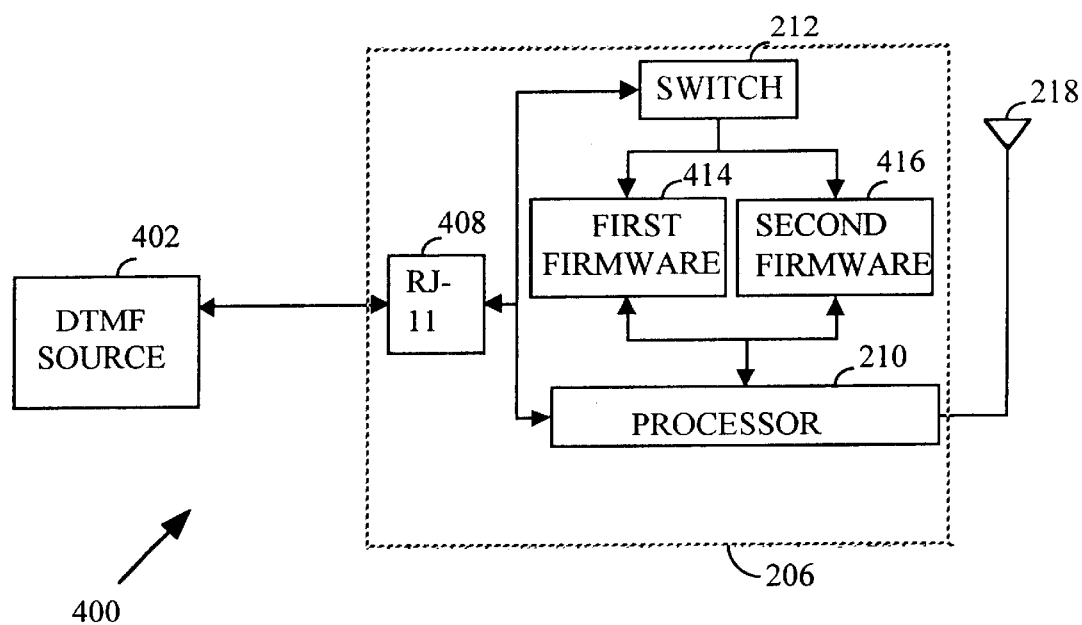
FIG. 4 is a block diagram of an embodiment of the apparatus (400) of the present invention viewed more generally.

FIG. 4 is a block diagram of an embodiment of the apparatus (400) of the present invention viewed more generally. It generally follows FIG. 2, with three changes. First, the computer (202), modem (204), and telephone (214) have been replaced with a DTMF source (402). Second, the RJ-11 interface (408) is now an interface without further specificity; it need not be a modem interface (208). Third, the Bell firmware (214) and V-series firmware (216) have been replaced with first (414) and second (416) firmwares. As before, a software implementation may also be used.

These changes indicate two things. First, it is not necessary for a telephone (214) and modem (204) to be connected to the RJ-11 interface (408) at the same time. It may be convenient to configure the wireless terminal (206) for a particular device while that device is attached to it. It may, however, be just as convenient to configure the terminal only once, perhaps with a telephone, and never change the device thereafter. It may even be convenient for each device—the DTMF source (402)—to assure that the terminal is properly configured by configuring the terminal itself, on power-up or some other convenient occasion.

Second, the switch (212) continues to invoke one or the other of the firmwares (414), (416), but it is not necessary that these firmwares be firmwares which are specific to a specific type of modem. It is not even necessary that the terminal (206) be configured to a modem at all. It could be configured to a fax machine or some other device.

Two firmwares, (414) and (416), are shown. Any convenient number of firmwares may be used (or their equivalent softwares), with a different DTMF code for each.

Figure 5:
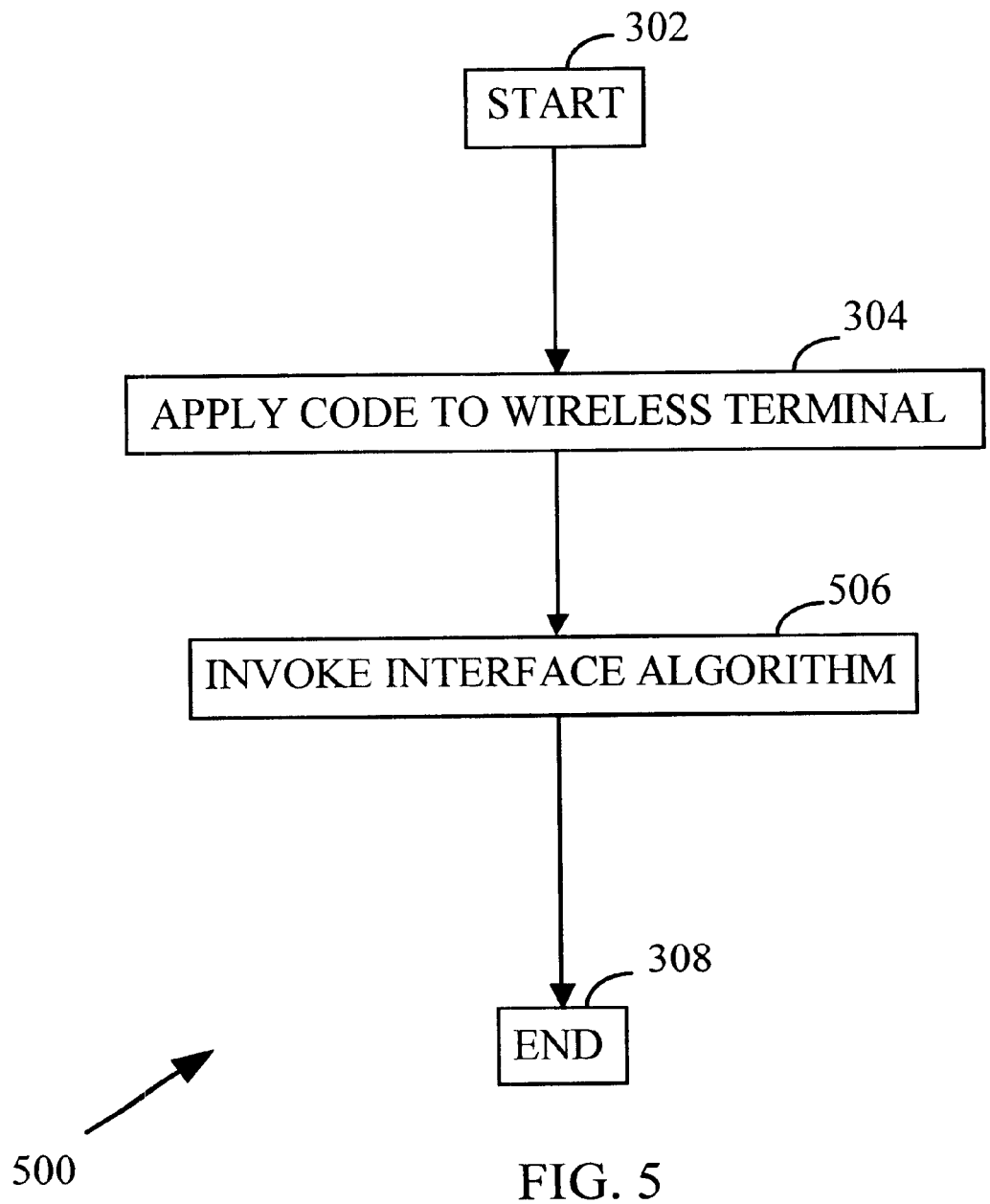
FIG. 5 is a block diagram of an embodiment of the method (500) of the present invention viewed more generally.

FIG. 5 is a block diagram of an embodiment of the method (500) of the present invention viewed more generally. It generally follows FIG. 3, except that the specific third step (306), "Invoke modem algorithm", has been replaced with a more general third step (506), "Invoke interface algorithm".

Industrial Application

Our invention is capable of exploitation in industry, and can be made and used, whenever is it desired to provide a single wireless terminal which can interface with several different types of devices. The individual components of the apparatus and method shown herein, taken separate and apart from one another, may be entirely conventional, it being their combination which we claim as our invention.

While we have described various modes of apparatus and method, the true spirit and scope of my invention are not limited thereto, but are limited only by the following claims and their equivalents, and we claim such as our invention:

What is claimed is:

1. A wireless terminal, wherein:
    (a) the wireless terminal includes an interface and a processor connected to the interface; and
    (b) the wireless terminal is characterized in that it further includes a switch which is:
        (1) connected to the interface and to the processor; and
        (2) constructed to configure the processor to invoke an interface algorithm in response to receipt, by the switch through the interface, of a sequence of Dual Tone Multiple Frequency (DTMF) tones.

2. The wireless terminal of claim 1, further characterized in that.
    (a) the interface algorithm is a first interface algorithm and the DTMF sequence is a first DTMF sequence; and (b) the switch is further constructed to configure the processor to invoke a second interface algorithm in response to receipt, by the switch through the interface, of a second DTMF sequence.

3. The wireless terminal of claim 2, further characterized in that:

(a) the first interface algorithm is a modem algorithm for a Bell modem; and (b) the second interface algorithm is a modem algorithm for a V-series modem.

4. A method of configuring a wireless terminal, wherein:

(a) the wireless terminal includes a modem interface and a processor connected to the interface; and (b) the method is characterized in that the method includes the acts of:

(1) applying a Dual Tone Multiple Frequency (DTMF) sequence through the interface to a switch in the wireless terminal; and (2) configuring the processor, under the control of the switch, to invoke an interface algorithm in response to the act of applying the DTMF sequence to the switch.

5. The method of claim 4, further characterized in that:

(a) the interface algorithm is a first interface algorithm and the DTMF sequence is a first DTMF sequence; and (b) the method further includes the acts of:

(1) applying a second DTMF sequence through the interface to the switch; and (2) configuring the processor, under the control of the switch, to invoke a second interface algorithm in response to the act of applying the second DTMF sequence to the switch.

6. The method of claim 5, further characterized in that:

(a) the first interface algorithm is a modem algorithm for a Bell modem; and (b) the second interface algorithm is a modem algorithm for a V-series modem.

7. The method of claim 5, further characterized in that the method further comprises the step of generating the DTMF sequence in a computer modem.

8. The method of claim 5, further characterized in that the method further comprises the step of generating the DTMF sequence in a telephone.

9. The method of claim 5, further characterized in that the method further comprises the step of generating the DTMP sequence in a fax machine.

* * * * *